United States Patent

Hill

[15] 3,672,688

[45] June 27, 1972

[54] TOY PHONOGRAPH

[72] Inventor: Charles P. Hill, Lorain, Ohio

[73] Assignee: The Leisure Group, Inc., Los Angeles, Calif.

[22] Filed: May 14, 1970

[21] Appl. No.: 37,084

[52] U.S. Cl. ....................274/14, 274/1 A

[51] Int. Cl. ....................G11b 17/06

[58] Field of Search....................274/1 A, 9, 14

[56] References Cited

UNITED STATES PATENTS 3,222,073 12/1965 Degaetano....................274/9

3,454,281 7/1969 Aleson....................274/1 A 2,780,466 2/1957 Like....................274/14

3,342,497 9/1967 Castagna....................274/1 A 3,461,604 8/1969 Glass et al....................274/1 A

*Primary Examiner*—Leonard Forman

*Assistant Examiner*—Charles E. Phillips

*Attorney*—Whittemore, Hulbert & Belknap

[57] ABSTRACT

A toy phonograph having a rotary turntable, a pivoted tone arm carrying a sound box and a pick-up needle, a manually operated reset means engageable with the tone arm to return the arm to a starting position, and an electrically conductive spring member engaging the arm to urge the needle into engagement with the record and forming a part of the motor circuit to energize the motor during play of the record and to shut off the motor when play is completed.

3 Claims, 3 Drawing Figures

INVENTOR
Charles P. Hill
BY Whittemore, Hulbert & Belknap
ATTORNEYS

TOY PHONOGRAPH

The present invention is directed to a toy phonograph mechanism suitable for use in a toy telephone or the like which utilizes a battery-powered electric motor to drive a turntable and has a pivoted tone arm carrying a sound amplifying diaphragm and a pick-up needle which is engageable with the record on the turntable. The motor is automatically deenergized when play of the record is completed, and a manual reset means including a depressible plunger is engageable with an end of the tone arm to lift the tone arm and swing the same back to a starting position. One of the principal advantages of the present construction is that it consists of relatively few parts, most of which may be made of molded plastic and which are easily assembled to reduce the cost of the mechanism below the cost of similar types of phonograph mechanisms which are presently available, while obtaining sound reproduction of improved quality. The invention also contemplates a simplified but accurate means of terminating play of the record when the needle reaches the end of the sound track in the record. A further feature of the improved mechanism comprises means for locating the tone arm in the proper starting position when the reset mechanism is actuated, and means for preventing overtravel of the tone arm as it reaches the end of the sound track.

Figures 1, 2, 3:
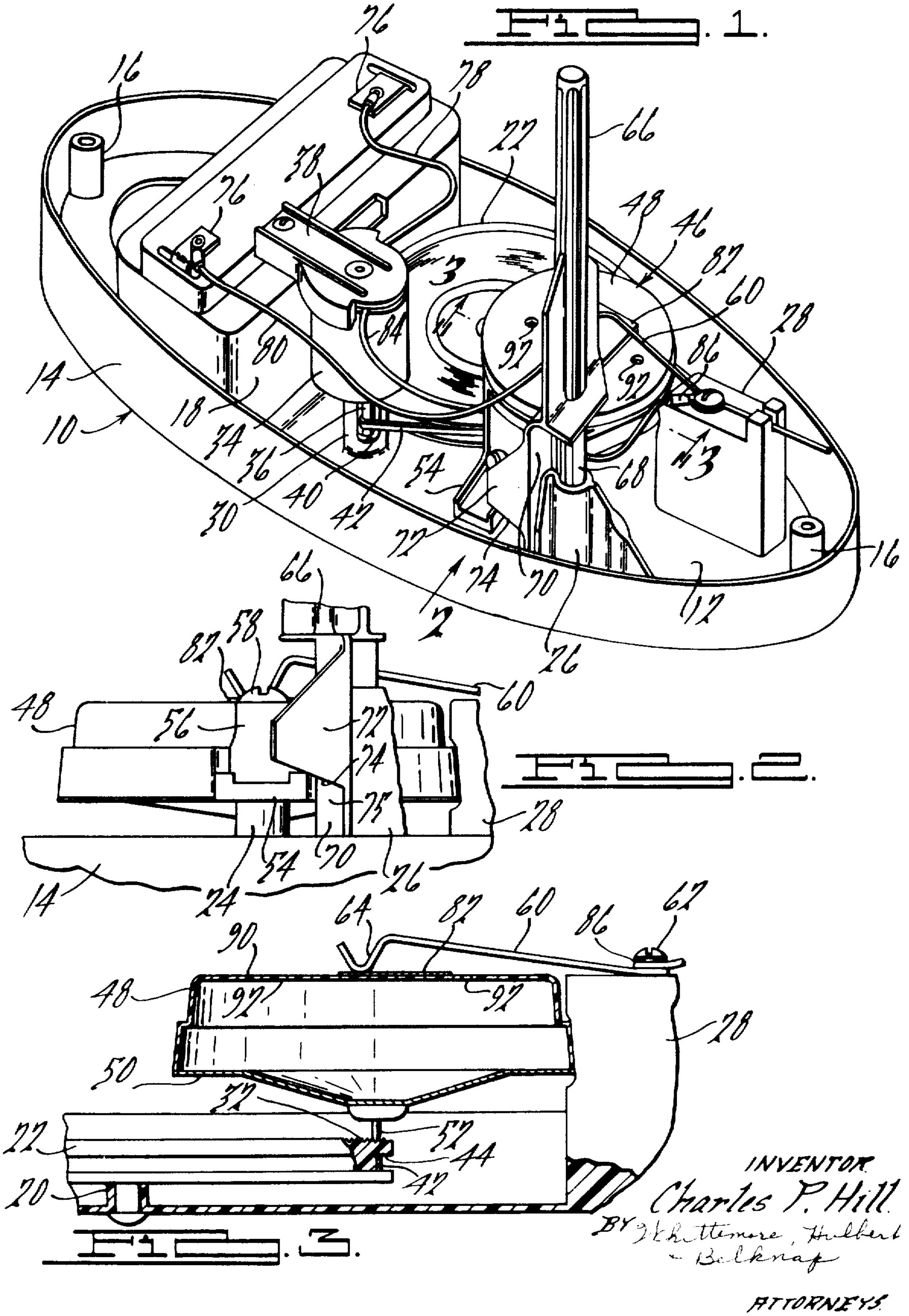
FIG. 1 is a perspective view of the improved phonograph mechanism.
FIG. 2 is a fragmentary side elevational view, looking in the direction of the arrow 2 in FIG. 1.
FIG. 3 is a sectional view taken on line 3—3 of FIG. 1.

The phonograph mechanism is shown in the drawings as installed in the base of a toy telephone but it will be apparent that the mechanism may be used in other toys or articles as desired. The base 10 of the toy telephone may consist of a one-piece molded plastic part having a bottom wall 12 and a peripheral wall 14. Bosses 16 are provided at appropriate locations so that the body portion, not shown, of the toy telephone may be secured to the base 10.

The base 10 has an integrally formed battery case 18 adapted to receive a conventional type of battery. The base 10 is also formed to provide an integral bearing 20 on which a rotary turntable 22 is mounted, a mounting post 24, a socket member 26, a block 28, and a guide member 30.

The upper surface of the turntable 22 may be provided with a playing groove as indicated at 32 or may be adapted to receive a separate record having the sound track thereon. An electric motor 34 having a drive shaft 36 is supported from the battery case 18 by a bracket 38. The motor shaft 36 extends downwardly into the guide member 30 which is provided with spaced openings 40 through which a rubber band or drive belt 42 extends. The drive belt 42 extends around the drive shaft 36 and around a perpheral groove 44 in the turntable 22 so that the turntable will be driven upon operation of the motor 34.

A tone arm 46 made of molded plastic has a larger end defining a hollow inverted cup-shaped sound box 48. A sound amplifying diaphragm 50 closes the lower end of the sound box 48 and at its center carries a pick-up needle 52 which is engageable with the sound track on the record. The tone arm 46 is provided with an extension 54 at one side thereof. The extension 54 is provided with a tubular boss 56 which is adapted to telescopically receive the upper end of the mounting post 24 to pivotally mount the tone arm on the mounting post for horizontal swinging movement and for limited movement in a vertical plane. A screw 58 secures the tone arm on the mounting post 24.

The block 28 extends upwardly from the floor 12 of the base 10 to about the height of the sound box 48 and as shown in FIG. 3 provides an abutment against which the tone arm may engage to determine the starting position of the tone arm. The block 28 also provides a mounting means for an electrically conductive spring member 60 which is secured to the block 28 by a screw 62. The outer end of the spring member 60 is provided with a curved contact portion 64 which is adapted to engage the upper surface of the portion 48 of the tone arm. The spring member 60 is stressed to urge the tone arm downwardly to engage the needle 52 with the sound track on the record. As will be explained more fully hereinafter, the spring member 60 forms a part of the motor circuit to energize the motor during play of the record and to deenergize the motor when play is completed.

The reset mechanism for returning the tone arm to its starting position comprises a manually depressible plunger 66 having its lower end 68 received within an upwardly opening socket formed in the portion 26 of the base 10. The reset plunger 66 is provided with a laterally offset portion 70 having a cam member 72 thereon provided with a downwardly facing inclined cam surface 74. The upper end of the plunger 66 is adapted to extend through an opening in the body portion of the toy telephone so as to be accessible for actuation.

The end portion of the extension 54 on the tone arm 46 extends beneath the cam surface 74 formed on the plunger 66. When play of the record is ended, the portion 48 of the tone arm will have swung in a counterclockwise direction as viewed in FIG. 1. The cam surface 74 on the plunger 66 engages the extension 54 on the side of the pivotal mounting of the tone arm opposite the end of the tone arm which carries the needle 52 so that depression of plunger 66 will first lift the tone arm slightly to disengage the needle from the sound track and will then swing the tone arm in a clockwise direction into engagement with the block 28 to return the tone arm to its correct starting position. The plunger may now be released and the spring member 60 will move the needle into engagement with the sound track.

The plunger 66 is shown in FIG. 2 in its depressed position and a spring, not shown, in the socket member 26 may be provided for urging the plunger to its upper position. The end 54 of the tone arm is engageable with the surface 75 on the offset portion 70 of the plunger 66 to limit movement of the tone arm and prevent overtravel thereof toward the center of the record. The block 28 and the stop surface 75 respectively prevent overtravel of the tone arm past its correct starting position and toward the center of the record, thus preventing possible damage to the tone arm and speaker assembly should such overtravel be permitted to occur.

The electrical circuit for the motor 34 includes a pair of contact members 76 adapted to engage the battery in a conventional manner and conductors 78 and 80 which are connected respectively to the motor 34 and a contact plate 82 which is secured to the upper surface of the portion 48 of the tone arm. A second motor lead 84 is electrically connected to spring member 60 by an electrical connector 86. As long as the contact portion of the spring member 60 is in engagement with the contact plate 82, the motor 34 will be energized. The lateral extent of the contact plate 82 is selected so that just after the needle 52 reaches the inner end of the sound track on the record, the spring member 60 will slide off of the contact plate 82 to open the motor circuit and stop the turntable. When the reset mechanism is actuated, the tone arm will swing into engagement with the block 28 as the contact portion 64 of the spring member 60 again is brought into engagement with the contact plate 82 to energize the motor so that playing of the record will immediately be initiated when the plunger 66 is released.

It will be noted that the top wall 90 of the sound box 48 is provided with two holes 92 disposed on opposite sides of the center of the sound box 48. The holes 92 constitute tuning ports which greatly improve the volume and acoustical qualities of the speaker unit.

What I claim as my invention is:

1. A phonograph for a toy telephone or the like comprising a base, a turntable rotatably mounted on said base, an electric motor supported from said base for rotating said turntable, a mounting post extending upwardly from said base, a tone arm pivotally mounted on said post for horizontal swinging movement and for limited movement in a vertical plane, one end of said arm carrying a sound amplifying diaphragm and a pick-up needle secured to said diaphragm and engageable with a record on said turntable, a reset plunger reciprocably mounted on said base and having a downwardly facing cam surface thereon, the other end of said arm extending beneath said cam surface and adapted to be engaged thereby upon depression of said plunger to lift said needle from the record and swing said arm to its starting position, an abutment adapted to be engaged by said one end of said arm upon actuation of the latter by said plunger to define the starting position of said arm, an electrical contact plate on the upper surface of said one end of said arm, an electrically conductive spring member secured to said abutment and engageable with said plate when said arm is in said starting position, said spring member urging said one end of said arm downwardly to engage the needle with the record, said contact plate and spring member being electrically connected into the motor circuit for operating said motor as long as said spring member is in engagement with said contact plate, said contact plate having an extent such that movement of said one end of said arm from its starting to its finishing position moves said plate out of engagement with said spring member to stop said motor.

2. A phonograph according to claim 1 wherein said plunger is provided with a laterally offset portion, and said other end of said arm is engageable with said offset portion of said plunger to limit swinging movement of said arm away from said abutment.

3. A phonograph according to claim 1 wherein said base comprises a molded plastic part having said mounting post, said abutment and a socket member formed integrally therewith, said plunger being reciprocable in said socket member.

* * * * *